United States Patent
Hong et al.

(10) Patent No.: US 10,997,766 B1
(45) Date of Patent: May 4, 2021

(54) AVATAR MOTION GENERATING METHOD AND HEAD MOUNTED DISPLAY SYSTEM

(71) Applicant: XRSPACE CO., LTD., Taoyuan (TW)

(72) Inventors: Wei-Zhe Hong, Miaoli County (TW); Pei-Wen Hsieh, Nantou County (TW)

(73) Assignee: XRSPACE CO., LTD., Taoyuan (TW)

( * ) Notice: Subject to any disclaimer, the term of this patent is extended or adjusted under 35 U.S.C. 154(b) by 0 days.

(21) Appl. No.: 16/676,416

(22) Filed: Nov. 6, 2019

(51) Int. Cl.
*G06T 13/40* (2011.01)
*G06T 13/80* (2011.01)
*G06F 3/01* (2006.01)

(52) U.S. Cl.
CPC .............. *G06T 13/40* (2013.01); *G06F 3/011* (2013.01); *G06T 13/80* (2013.01)

(58) Field of Classification Search
None
See application file for complete search history.

(56) References Cited

U.S. PATENT DOCUMENTS

| | | | | |
|---|---|---|---|---|
| 6,329,994 | B1* | 12/2001 | Gever | G06T 13/20 345/473 |
| 2009/0213123 | A1* | 8/2009 | Crow | G06K 9/00342 345/473 |
| 2012/0223952 | A1* | 9/2012 | Kanemaru | G06K 9/00335 345/473 |
| 2014/0035929 | A1* | 2/2014 | Matthews | G06K 9/00315 345/473 |
| 2014/0184496 | A1* | 7/2014 | Gribetz | G02B 27/017 345/156 |
| 2016/0235323 | A1 | 8/2016 | Tadi et al. | |
| 2017/0069125 | A1* | 3/2017 | Geisner | G06K 9/00342 |
| 2018/0359448 | A1 | 12/2018 | Harries | |
| 2019/0096106 | A1 | 3/2019 | Shapiro et al. | |
| 2019/0287313 | A1 | 9/2019 | Kavallierou | |
| 2020/0058148 | A1* | 2/2020 | Blaylock | G06T 7/248 |

FOREIGN PATENT DOCUMENTS

| | | |
|---|---|---|
| CN | 106575444 | 4/2017 |
| JP | 2005216149 | 8/2005 |
| JP | 2007334443 | 12/2007 |
| JP | 2019049987 | 3/2019 |
| TW | I650985 | 2/2019 |

OTHER PUBLICATIONS

"Search Report of Europe Counterpart Application", dated Apr. 1, 2020, p. 1-p. 7.
"Office Action of Japan Counterpart Application", dated Feb. 2, 2021, p. 1-p.8.

* cited by examiner

*Primary Examiner* — Matthew Yeung
(74) *Attorney, Agent, or Firm* — JCIP Global Inc.

(57) ABSTRACT

An avatar motion generating method and a head mounted display system are provided. In the method, an input event is received, and the input event is related to sensing result of a user. First avatar motion is generated based on one of predefined motion data, motion sensing data and a combination thereof at the first period of time. Second avatar motion is generated based on another of the predefined motion data, the motion sensing data and the combination thereof at the second period of time. Accordingly, the motion of the avatar could be smooth and natural.

18 Claims, 4 Drawing Sheets

AVATAR MOTION GENERATING METHOD AND HEAD MOUNTED DISPLAY SYSTEM

BACKGROUND OF THE DISCLOSURE

1. Field of the Disclosure

The present disclosure generally relates a method for generating the motion of an avatar, in particular, to an avatar motion generating method and a head mounted display system.

2. Description of Related Art

Technologies for simulating senses, perception and/or environment, such as virtual reality (VR), augmented reality (AR), mixed reality (MR) and extended reality (XR), are popular nowadays. The aforementioned technologies can be applied in multiple fields, such as gaming, military training, healthcare, remote working, etc.

In order to let the user perceive the simulated environment as a real environment, motion of the body portions in the real world would be tracked, so that the displaying image and the motion of an avatar on a VR, AR, MR or XR display can be changed in response to the motion of the user. For example, the motion sensing result of a hand-held controller can be used to estimate the pose of a hand and generate a corresponding motion accordingly. However, the estimation of the pose may not be accurate in some situations. Eventually, an abnormal motion may be presented on the avatar. Therefore, there are still lots of technical problems that should be improved for the motion simulation of the avatar.

SUMMARY OF THE DISCLOSURE

Accordingly, the present disclosure is directed to an avatar motion generating method and a head mounted display system, in which the motion of an avatar may be changed to a predefined motion in response to some situations.

In one of the exemplary embodiments, an avatar motion generating method includes, but not limited to, the following steps. First avatar motion is generated based on one of predefined motion data, motion sensing data and a combination thereof at the first period of time. Second avatar motion is generated based on another of the predefined motion data, the motion sensing data and the combination thereof at the second period of time.

In one of the exemplary embodiments, a head mounted display system wearable on a user's head includes, but not limited to, a memory and a processor. The memory is used for storing a program code. The processor is coupled to the memory and loads the program code to perform the following steps. The processor generate first avatar motion a determined result, switches between predefined motion data and motion sensing data based on one of predefined motion data, motion sensing data and a combination thereof at the first period of time, and generates second avatar motion based on another of the predefined motion data, the motion sensing data and the combination thereof at the second period of time.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
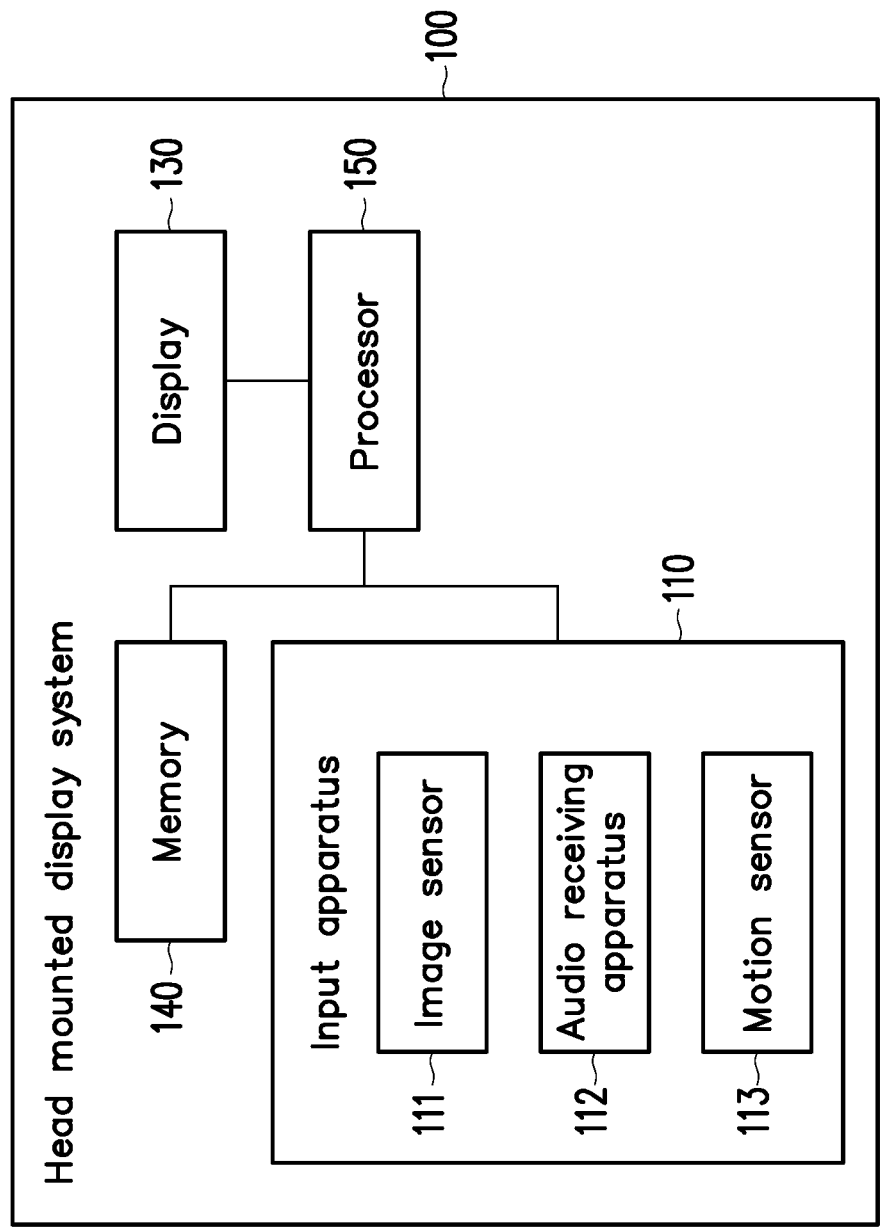
FIG. 1 is a block diagram illustrating a head mounted display system according to one of the exemplary embodiments of the disclosure.

Reference will now be made in detail to the presently preferred embodiments of the disclosure, examples of which are illustrated in the accompanying drawings. Wherever possible, the same reference numbers are used in the drawings and the description to refer to the same or like parts.

FIG. 1 is a block diagram illustrating a head mounted display (HMD) system 100 according to one of the exemplary embodiments of the disclosure. Referring to FIG. 1, the HMD system 100 includes, but not limited to, an input apparatus 110, a memory 140 and a processor 150. The HMD system 100 is adapted for VR, AR, MR, XR or other reality-related technology.

The input apparatus 110 is used for obtaining user data. The user data is related to a sensing result of a user. The sensing result may be related to the voice, the motion, the facial expression and/or the operation of the user. Alternatively, the user data could be a combination of voice data, motion sensing result, and image data.

In one embodiment, the input apparatus 110 includes an image sensor 111. The image sensor 111 may be a camera, such as a monochrome camera or a color camera, a deep camera, a video recorder, or other sensor capable of capturing images.

In some embodiments, the image sensor 111 may be used to capture toward one or more human body portions of the user, to generate an image including the human body portion of the user. For example, the human body portions may include a face, a hand, a head, an ankle, a leg or a waist of the user.

In some embodiments, the image sensor 111 may be used to capture toward the face of a user, to generate a facial image including one or both eye, one or both ear, a nose, a mouse, a face shape, a hair shape, an eyebrow, a bread or a combination thereof of the user.

In one embodiment, the input apparatus 110 includes an audio receiving apparatus 112. The audio receiving apparatus 112 may include, but not limited to, a microphone, an analog-to-digital converter, a filter, and an audio processor. The microphone of the audio receiving apparatus 112 may receive sound waves (e.g., generated by human voices, ambient sounds, etc.) and converting them into sound data.

In some embodiments, the audio receiving apparatus 112 is used to receive the voice of a user and generate voice data. In some embodiments, the HMD system 100 may not have the audio receiving apparatus 112.

In one embodiment, the input apparatus 110 includes a motion sensor 113. The motion sensor 113 may be an accelerometer, a gyroscope, a magnetometer, a laser sensor, an inertial measurement unit (IMU), an infrared ray (IR) sensor, or any combination of aforementioned sensors. In the embodiment of the disclosure, the motion sensor 113 is used for sensing the motion of one or more human body portions of the user, to generate a sequence of motion sensing result of the sensor 110 (e.g. sensed strength values, etc.) at several time points. For one example, the motion sensing result includes a 3-degree of freedom (3-DoF) data, and the 3-DoF data is related to the rotation data of the human body portion in a three-dimensional (3D) space, such as accelerations in yaw, roll and, pitch. For another example, the motion sensing result includes a relative position and/or displacement of a human body portion in the 2D/3D space.

It should be noticed that the motion sensor 113 could be embedded in a handheld controller or a wearable apparatus, such as a wearable controller, a smartwatch, an ankle sensor, a head-mounted display (HMD), or the likes.

In some embodiments, the HMD system 100 further includes a display 130. The display 130 may be a liquid-crystal display (LCD), a light-emitting diode (LED) display, an organic light-emitting diode (OLED) display, or other displays. In the embodiment of the disclosure, the display 130 is used for displaying images. It should be noted that, in some embodiments, the display 130 may be a display of an external apparatus (such as a smartphone, a tablet, or the likes), and the external apparatus can be placed on the main body of the HMD system 100.

The memory 140 may be any type of a fixed or movable Random-Access Memory (RAM), a Read-Only Memory (ROM), a flash memory, a similar device or a combination of the above devices. The memory 140 records program codes, device configurations, buffer data or permanent data (such as image data, voice data, motion sensing data, predefined motion data, motion sensing result, etc.), and these data would be introduced later.

The processor 150 is coupled to the input apparatus 110, the display 130, and the memory 140. The processor 150 is configured to load the program codes stored in the memory 140, to perform a procedure of the exemplary embodiment of the disclosure.

In some embodiments, functions of the processor 150 may be implemented by using a programmable unit such as a central processing unit (CPU), a microprocessor, a microcontroller, a digital signal processing (DSP) chip, a field-programmable gate array (FPGA), etc. The functions of the processor 150 may also be implemented by an independent electronic device or an integrated circuit (IC), and operations of the processor 150 may also be implemented by software.

It should be noticed that the processor 150 may not be disposed at the same apparatus with the input apparatus 110. However, the apparatuses respectively equipped with input apparatus 110 and the processor 150 may further include communication transceivers with compatible communication technology, such as Bluetooth, Wi-Fi, infrared ray (IR), or physical transmission line, to transmit or receive data with each other. For example, the audio receiving apparatus 112 and the processor 150 may be disposed in an HMD while the image sensor 111 is disposed outside the HMD. For another example, the processor 150 may be disposed in a server while the image sensor 111 and the audio receiving apparatus 112 being disposed outside the server.

To better understand the operating process provided in one or more embodiments of the disclosure, several embodiments will be exemplified below to elaborate the operating process of the HMD system 100. The devices and modules in the HMD system 100 are applied in the following embodiments to explain the avatar motion generating method provided herein. Each step of the method can be adjusted according to actual implementation situations and should not be limited to what is described herein.

Figure 2:
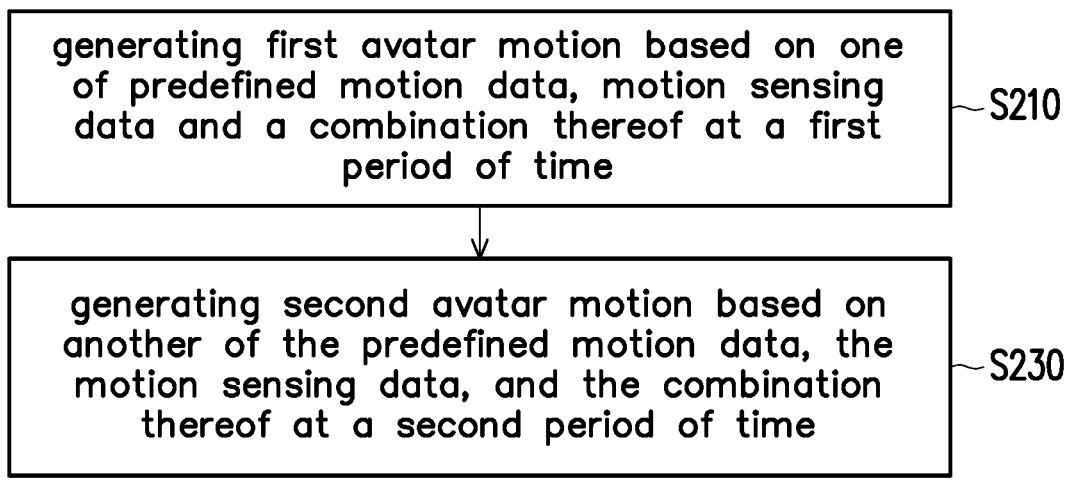
FIG. 2 is a flowchart illustrating an avatar motion generating method according to one of the exemplary embodiments of the disclosure.

FIG. 2 is a flowchart illustrating an avatar motion generating method according to one of the exemplary embodiments of the disclosure. Referring to FIG. 2, the processor 150 may generate first avatar motion based on one of predefined motion data, motion sensing data and a combination thereof at a first period of time (step S210). Specifically, the predefined motion data is pre-stored in the memory 140 without motion sensing result of a human body portion of the user. In other words, the predefined motion data is not generated based on the currently detected motion sensing result of the user. For example, the predefined motion could be the motion of a hand for shooting darts or shooting hoops. The predefined motion data may include specific motion data (such as 3-DoF data or 6-DoF data, accelerations in yaw, roll and, pitch, the displacement, etc.) for each predefined motion of different human body portions. Taking the foot of the user as an example, the predefined motion may be lifting, pointing, kicking, stepping, or jumping.

It should be noted that there may be more than one predefined motion for presenting the current state or emotion on the avatar. For example, there may be 10 predefined motions for an idle state of the avatar, and the processor 150 may select one of the 10 predefined motions to be the reference of the predefined motion data. In some embodiments, there may be merely one predefined motion for presenting one current state or one emotion on the avatar. For example, the motion of a hand for shooting darts.

On the other hand, the motion sensing data is generated based on the currently detected motion sensing result of the user. The motion sensing data is related to one or more essential motions, and the motion sensing data may include specific motion data based on the motion sensing result (such as 3-DoF or 6-DoF data, accelerations in yaw, roll and, pitch, the displacement, etc.) for each essential motion.

In one embodiment, the processor 150 may determine a pose of one or more human body portions based on the motion sensing result and inverse kinematics to generate the motion sensing data. Based on the inverse kinematics, given position information of the end of the arm can be used to estimate joint parameters (such as the angle between the upper arm and the forearm, the angle between the shoulder and the upper arm, etc.). The given position information can be provided by the motion sensing result. For example, 6-DoF data obtained from the motion sensor 113 disposed at a handheld control can be used to determine the position of the hand of the user. The joint parameters can be determined based on the determined position from the motion sensing result of the motion sensor 113 and/or the image sensor 111, so as to further determine the pose of the arm based on kinematics equations. It should be noted that the poses of the legs, the upper body, the head, and other human body portions can be estimated based on inverse kinematics, too, and their detailed description would be omitted.

In some embodiments, the motion sensor 113 may be disposed at multiple human joints or body portions, or the image sensor 111 may capture all of or the desired human body portions of the user, the motion sensing result of the motion sensor 113 and/or the image sensor 111 can be used for estimating the pose of the corresponding human body portion directly.

In one embodiment, the processor 150 may generate the combination of the predefined motion data and the motion sensing data. In some embodiments, the combination could be a weight combination of the predefined motion data and the motion sensing data. For example, the position based on the predefined motion data is given with a first weight, the position based on the motion sensing data is given with a second weight, and the weight combination would be the weighted calculation on the positions based on the predefined motion data and the motion sensing data with the first and the second weights. In another embodiment, the combination would be another predefined motion data based on the original predefined motion data and the motion sensing data. For example, the positions and the rotation situations based one the original predefined motion data and the motion sensing data would be considered as references to determine the position and the rotation situation in the another predefined motion data.

The avatar motion is the motion of the avatar in the virtual environment. The processor 150 may select one of the predefined motion data, the motion sensing data and the combination thereof for the first avatar motion at the first period. In other words, a predefined motion, a sensing motion of the user, or the combination thereof would be performed on the avatar at the first period.

The processor 150 may generate second avatar motion based on another of the predefined motion data, the motion sensing data and the combination thereof at a second period of time (step S230). Specifically, compared with the first avatar motion at the first period, another avatar motion (i.e., the second avatar motion) is generated based on a different motion data at the second period. For example, the first avatar motion is generated based on the motion sensing data, and the second avatar motion is generated based on the predefined motion data. For another example, the first avatar motion is generated based on the combination of both motion data and the second avatar is generated based on the predefined motion data.

In general, the estimated pose merely based on the motion sensing data may result in an abnormal motion on the avatar. It should be noted that it can be sure that the predefined motion data may present a natural and normal motion of the human. In some situations, the use of the predefined motion data may prevent the abnormal motion on the avatar. However, in other situations, it would need to reflect the actual motion of the user based on the motion sensing data. Therefore, a change of motion data among the motion sensing data, predefined motion data and the combination thereof may help in different situations.

In one embodiment, two different avatar motions for one human body portion would be generated at different time periods. In this embodiment, the processor 150 may receive an input event from the user data obtained by the input apparatus 110 at the first period. Specifically, the input event may be encountering a scenario/level of the game, a motion of the user being detected, user data (such as voice data, image data, motion sensing result, text data, input operation of a user, etc.) being received, etc. For example, the reception of the voice data by the audio receiving apparatus 112 could be an input event. For another example, the detection of the motion sensing result by the motion sensor 113 could be another input event. Alternatively, the selection of cinema scenario could be an input event.

In one embodiment, the processor 150 may determine whether the input event is met one of predefined triggering conditions to generate a determined result. Specifically, each predefined triggering condition may be corresponding to a movement of one human body portion, a rotation of one human body portion, a pose of one human body portion, a gesture of a hand, an emotion, a scenario, a level of a game, or a keyword/keyphrase. The predefined triggering condition could be that, for example, the head of the user moves horizontally; the head of the user rotates clockwise and horizontally; the hand of the user exists in the image data; the hand of the user makes a fist; the lips of the user make a smile; entering a basketball game scenario; the keywords "very happy" is detected in the voice data. Regarding different types of the predefined triggering conditions, the processor 150 may use the image identification, the semantic analysis, the motion state analysis, or other technologies to compare the input event with the corresponding predefined triggering condition. The determined result would be the input event is met a corresponding predefined triggering condition or input event is not met a corresponding predefined triggering condition.

Then, the processor 150 may generate the second avatar motion at the second period in response to the input event being met anyone of the predefined triggering conditions. In one embodiment, the processor 150 may switch between predefined motion data and motion sensing data according to the determined result. The predefined triggering conditions correspond to the conditions for the change of motion data. If the determined result is that the input event is met one of the predefined triggering conditions, the motion data for generating the motion of the avatar may be changed from the motion sensing data to the predefined motion data or from the predefined motion data to the motion sensing data. For example, the processor 150 detects that the input event is that the head of the user moves horizontally, the processor 150 may change the motion data from the motion sensing data to the predefined motion data, so that a predefined walk motion (i.e., the second avatar motion) for legs may be presented on the avatar. For another example, the processor 150 detects that the input event is that the hand of the user exists in the camera image obtained from the image sensor 111, the processor 150 may change the motion data from the predefined motion data to the motion sensing data, so that the hand of the avatar may move based on the motion sensing result (i.e., the second avatar motion). Still another example, the processor 150 detects that the input event is that a throw motion of the hand of the user is detected when the hand of the avatar holds a dart, the processor 150 may change the motion data from the motion sensing data to the predefined motion data, so that the hand of the avatar may shoot the dart based on the predefined motion (i.e., the second avatar motion).

In another embodiment, the processor 150 may obtain a behavior state of the avatar from a state machine, and the behavior state is related to the currently performing behavior of the avatar. The behavior state of the state machine may be idle, standing, sitting, walking, running, jumping, or other states. The processor 150 may compare the input event with the current behavior state in response to the determined result being that the input event is met one of the predefined triggering conditions, and the compared result may trigger the change of the motion data.

In one embodiment, the processor 150 may provide a priority for the input event, and compare the priorities of the input event and the behavior state. It is assumed that the priority of the input event and the priority of the current behavior state are fixed. It means that each input event has a corresponding priority, and each behavior state has another corresponding priority. The processor 150 may switch between the predefined motion data and the motion sensing data in response to the input event having higher priority than the behavior state, and the behavior state would be modified accordingly. For example, the current behavior state is standing, and the standing state for the legs of the avatar has a lower priority than the input event which is that the head of the user moves horizontally. Then, the modified behavior state would be the walking state. On the other hand, in response to the input event not having a higher priority than the behavior state, the change of the motion data would be no need.

In another embodiment, the processor 150 may provide a weight for the input event, and compare the weights of the input event and the behavior state. It is assumed that the weight of the input event and the weight of the current behavior state are variable based on different scenarios. The processor 150 may switch between the predefined motion data and the motion sensing data in response to the input event having higher weight than the behavior state. For example, at the first time point, the weight of the input event is 80, the weight of the behavior state is 90, and the change of the motion data would not happen. Then, at the second time point, the weight of the input event is 90, the weight of the behavior state is 70, and the change of the motion data may happen.

It should be noticed that the motion data to present the behavior state may be the predefined motion data or the motion sensing data based on the actual situation.

In one embodiment, the processor 150 may switch between the predefined motion data and the motion sensing data in response to the input event not exist. For example, no motion is detected from the handheld controller, the hand of the user does not exist in the camera image, or the user chooses to exit from the basketball game, etc. In some embodiments, some input events may be predefined with continuation times. When a corresponding continuation time expires, the processor 150 may determine that the input event does not exist. Then, the processor 150 may return to a previous behavior state from the behavior state modified by the input event. For example, the input event is a laugh from the voice data obtained from the audio receiving apparatus 112, a predefined laugh motion would be performed on the avatar's hand for 2 seconds, and then the motion of the avatar's hand may be based on motion sensing data.

In some embodiments, the processor 150 may further receive one or more second input events (i.e., other input events). If the input event still exists, the processor 150 may compare the second input event with the input event to generate a comparing result. For example, the timing, the priorities, or the weights of these input events may be compared. The processor 150 may generate third avatar motion of the human body portion of the avatar based on motion data of one of the input event and the second input event according to the comparing result. For example, the priority of the second input event is higher than the input event, the processor 150 may choose the second input event to be the reference of the motion data. For another example, the weight of the input event is higher than the second input event, the processor 150 may choose the input event.

When the processor 150 determines the motion data, the processor 150 may generate the motion of the human body portion of the avatar based on the predefined motion data and the motion sensing data at different time periods. Specifically, the motion of the avatar presented in the display 130 can be generated according to the determined motion data. For example, the motion of the leg of the user is lifting, and the avatar may lift its leg based on the motion sensing data. For another example, the legs of the avatar perform the predefined walk motion. However, regarding one human body of the avatar, the processor 150 may choose one of the predefined motion data and the motion sensing data one time.

Figure 3:
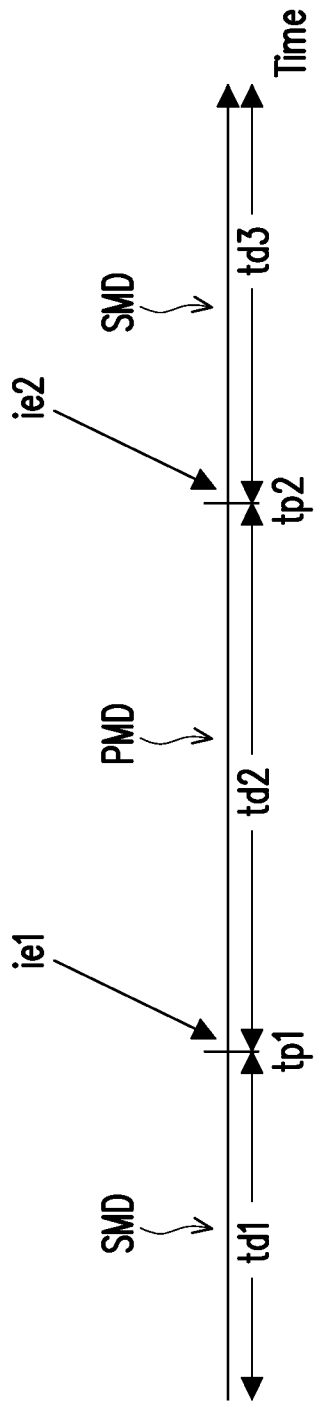
FIG. 3 is a timing diagram illustrating the switching between different motion data according to one of the exemplary embodiments of the disclosure.

FIG. 3 is a timing diagram illustrating the switching between different motion data according to one of the exemplary embodiments of the disclosure. It is assumed that the motion of the avatar is generated based on the motion sensing data SMD at first time period td1. At the time point tp1, an input event ie1 is received, and the processor 150 determines to switch the motion data from the motion sensing data SMD to the predefined motion data PMD. Then, the motion of the avatar is generated based on the predefined motion data PMD at the time period td2. At the time point tp2, another input event ie2 is received, and the processor 150 determines to switch the motion data from the predefined motion data PMD to the motion sensing data SMD. Then, the motion of the avatar is generated based on the motion sensing data SMD at the time period td3.

Sometimes, the change of motion data may result in an abnormal behavior on the avatar. In one embodiment, the processor 150 may generate transition avatar motion based on both the predefined motion data and the motion sensing data. It means that a transition would be inserted between two motion data. For example, the processor 150 may find some intermediate positions between the final position of the avatar's hand based on the motion sensing data and the initial position of the avatar's hand based on the predefined motion data as parameters of the transition motion data. Similarly, the pose and the rotation manner of the human body portion of the transition avatar motion is determined based on a transition between the motion sensing data and the predefined motion data.

Figure 4:
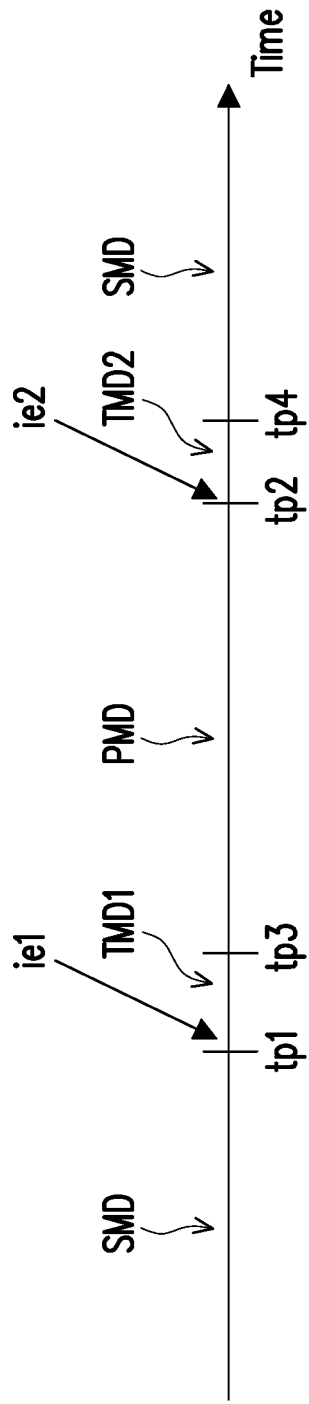
FIG. 4 is a timing diagram illustrating the switch between different motion data according to one of the exemplary embodiments of the disclosure.

Then, the processor 150 generates the motion of the human body portion of the avatar based on the transition avatar motion at the third period of time between the first period and the second period in which the first avatar motion is generated at the first period and the second avatar motion is generated at the second period. FIG. 4 is a timing diagram illustrating the switch between different motion data according to one of the exemplary embodiments of the disclosure. Referring to FIG. 4, the difference from the embodiment of FIG. 3 is that, in response to the input event ie1 being received, the processor 150 generates the motion of the avatar based on the transition motion data TMD1, which is the combination of the predefined motion data PMD and the motion sensing data SMD, between time points tp1 and tp3. Then, at the time point tp3, the processor 150 generates the motion of the avatar based on the predefined motion data PMD. In addition, in response to the input event ie2 being received, the processor 150 generates the motion of the avatar based on the transition motion data TMD2, which is the combination of the predefined motion data PMD and another motion sensing data SMD, between time points tp2 and tp4. Then, at the time point tp4, the processor 150 generates the motion of the avatar based on the motion sensing data SMD.

The aforementioned embodiments introduce the switch of motion data between the motion sensing data and the predefined motion data for one human body motion. It means that, for one human body portion, the motion sensing data and the predefined motion data may used at different time periods. In some embodiment, for multiple human body motion, the processor 150 may generate the motion of a first human body portion of the avatar based on the predefined motion data and the motion of a second human body portion of the avatar different from the first human body portion based on the motion sensing data at the same time period.

Figure 5:
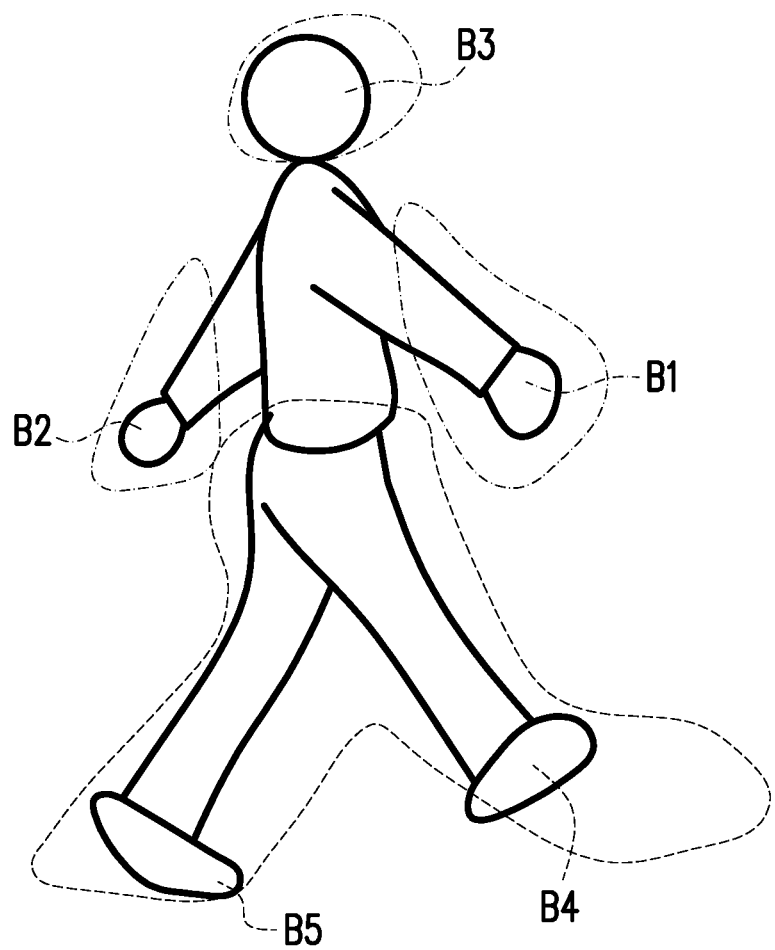
FIG. 5 is a schematic diagram illustrating the human body portions of an avatar according to one of the exemplary embodiments of the disclosure.

FIG. 5 is a schematic diagram illustrating the human body portions of an avatar according to one of the exemplary embodiments of the disclosure. Referring to FIG. 5, it is assumed that the body of the avatar is divided into 5 human body portions B1~B5. The head mounted display system 100 may provide handheld controllers with the motion sensor 113 and a head mounted display with the image sensor 111 and the motion sensor 113 to detect the motion of the human body portions B1~B3. Therefore, the motion of the human body portions B1~B3 may be generated based on the motion sensing data from the motion sensing result of the image sensor 111 and the motion sensor 113. On the other hand, the motion of the human body portions B4 and B5 may be generated based on the predefined motion data.

It should be noticed that, base on different design requirements, the body of the avatar may be further divided into more or less human body portions. For example, the human body portions B1 is further divided into two portions, which are the arm and the palm. For another example, merely the human body portions B1 and B2 are generated based on the motion sensing data, and other human body portions B3~B5 are generated based on the predefined motion data.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An avatar motion generating method, comprising:
generating first avatar motion based on one of predefined motion data, motion sensing data and a combination thereof at a first period of time;
receiving an input event in the first period of time, wherein the input event is related to motion sensing result sensing from the user, and the motion sensing result is determined based on the motion sensing data;
obtaining a behavior state of an avatar from a state machine, wherein the behavior state represents currently performing behavior of the avatar;
determining the input event is met one of a plurality of predefined triggering conditions for a transition among the predefined motion data, the motion sensing data, and the combination thereof, and further comparing a first value of the input event with a second value of the behavior state of the avatar;
in response to the first value of the input event being higher than the second value of the behavior state of the avatar and the input event being met one of the plurality of predefined trigger conditions, generating second avatar motion based on another of the predefined motion data, the motion sensing data, the combination thereof, and the comparing result with the behavior state of the avatar at a second period of time; and
in response to the first value of the input event being lower than the second value of the behavior state of the avatar but the input event being met one of the plurality of predefined triggering conditions, generating the second avatar motion based on the same one of the predefined motion data, the motion sensing data, and the combination thereof as the first period at the second period of time.

2. The avatar motion generating method according to claim 1, further comprising:
performing the step of generating the second avatar motion in response to the input event being met anyone of the plurality of predefined triggering conditions.

3. The avatar motion generating method according to claim 1, wherein the step of comparing the input event with the behavior state comprises:
switching between the predefined motion data and the motion sensing data in response to the input event having higher priority than the behavior state, wherein a priority of the input event and a priority of the behavior state are fixed, the priority of the input event is the first value, and the priority of the behavior state is the second value.

4. The avatar motion generating method according to claim 1, wherein the step of comparing the input event with the behavior state comprises:
switching between the predefined motion data and the motion sensing data in response to the input event having higher weight than the behavior state, wherein a weight of the input event and a weight of the behavior state are variable, the weight of the input event is the first value, and the weight of the behavior state is the second value.

5. The avatar motion generating method according to claim 2, wherein the step of generating the second avatar motion comprises:
switching between the predefined motion data and the motion sensing data in response to the input event not exist.

6. The avatar motion generating method according to claim 1, further comprising:
generating a transition motion data according to both the predefined motion data and the motion sensing data; and
generating transition avatar motion based on the transition motion data at a third period of time between the first period and the second period.

7. The avatar motion generating method according to claim 2, further comprising:
receiving a second input event;
comparing the second input event with the input event to generate a comparing result; and
generating third avatar motion based on motion data of one of the input event and the second input event according to the comparing result.

8. The avatar motion generating method according to claim 1, wherein the step of generating the first avatar motion based on one of the predefined motion data, the motion sensing data and the combination thereof at the first period of time, further comprises:
generating motion of a first human body portion of an avatar based on the predefined motion data and motion of a second human body portion of the avatar based on the motion sensing data at the same period of time.

9. The avatar motion generating method according to claim 1, further comprising:
determining a pose of a human body portion based on motion sensing result and inverse kinematics to generate the motion sensing data.

10. A head mounted display system, wearable on a user's head, the head mounted display system comprising:
a memory, storing a program code; and a processor, coupled to the memory, and loading the program code to perform:
generating first avatar motion based on one of predefined motion data, motion sensing data and a combination thereof at a first period of time;
receiving an input event in the first period of time, wherein the input event is related to motion sensing result sensing from the user, and the motion sensing result is determined based on the motion sensing data;
obtaining a behavior state of an avatar from a state machine, wherein the behavior state represents currently performing behavior of the avatar;
determining the input event is met one of a plurality of predefined triggering conditions for a transition among the predefined motion data, the motion sensing data, and the combination thereof, and further comparing a first value of the input event with a second value of the behavior state of the avatar;
in response to the first value of the input event being higher than the second value of the behavior state of the avatar and the input event being met one of the plurality of predefined trigger conditions, generating second avatar motion based on another of the predefined motion data, the motion sensing data, the combination thereof, and the comparing result with the behavior state of the avatar at a second period of time; and
in response to the first value of the input event being lower than the second value of the behavior state of the avatar but the input event being met one of the plurality of predefined triggering conditions, generating the second avatar motion based on the same one of the predefined motion data, the motion sensing data, and the combination thereof as the first period at the second period of time.

11. The head mounted display system according to claim 10, wherein the processor is configured to perform:
performing the step of generating the second avatar motion in response to the input event being met anyone of the plurality of predefined triggering conditions.

12. The head mounted display system according to claim 10, wherein the processor is further configured to perform:
switching between the predefined motion data and the motion sensing data in response to the input event having higher priority than the behavior state, wherein a priority of the input event and a priority of the behavior state are fixed the priority of the input event is the first value, and the priority of the behavior state is the second value.

13. The head mounted display system according to claim 10, wherein the processor is further configured to perform:
switching between the predefined motion data and the motion sensing data in response to the input event having higher weight than the behavior state, wherein a weight of the input event and a weight of the behavior state are variable, the weight of the input event is the first value, and the weight of the behavior state is the second value.

14. The head mounted display system according to claim 11, wherein the processor is further configured to perform:
switching between the predefined motion data and the motion sensing data in response to the input event not exist.

15. The head mounted display system according to claim 11, wherein the processor is further configured to perform:
generating a transition motion data according to both the predefined motion data and the motion sensing data; and
generating transition avatar motion based on the transition motion data at a third period of time between the first period and the second period.

16. The head mounted display system according to claim 11, wherein the processor is further configured to perform:
receiving a second input event;
comparing the second input event with the input event to generate a comparing result; and
generating third avatar motion based on motion data of one of the input event and the second input event according to the comparing result.

17. The head mounted display system according to claim 10, wherein the processor is further configured to perform:
generating motion of a first human body portion of an avatar based on the predefined motion data and motion of a second human body portion of the avatar based on the motion sensing data at the same period of time.

18. The head mounted display system according to claim 10, wherein the processor further performs:
determining a pose of a human body portion based on motion sensing result and inverse kinematics to generate the motion sensing data.

* * * * *